United States Patent
Hansell et al.

(10) Patent No.: US 12,086,750 B2
(45) Date of Patent: Sep. 10, 2024

(54) UNMANNED AUTONOMOUS CONTAINER INSPECTION

(71) Applicant: LANTERN UNMANNED AUTONOMOUS SYSTEMS, LLC, Austin, TX (US)

(72) Inventors: David Hansell, San Carlos, CA (US); Benjamin Rohrbaugh, Austin, TX (US); Brian S. Henderson, Boston, MA (US)

(73) Assignee: LANTERN UNMANNED AUTONOMOUS SYSTEMS, LLC, Austin, TX (US)

( * ) Notice: Subject to any disclaimer, the term of this patent is extended or adjusted under 35 U.S.C. 154(b) by 0 days.

(21) Appl. No.: 17/322,003

(22) Filed: May 17, 2021

(65) Prior Publication Data

US 2021/0272227 A1     Sep. 2, 2021

Related U.S. Application Data (63) Continuation of application No. 16/024,983, filed on Jul. 2, 2018, now Pat. No. 11,010,852.

(Continued)

(51) Int. Cl.
*B64C 39/02*     (2023.01)
*G01T 1/167*     (2006.01)
(Continued)

(52) U.S. Cl.
CPC .......... *G06Q 10/08* (2013.01); *B64C 39/024* (2013.01); *G01T 1/167* (2013.01); *G01V 5/26* (2024.01);
(Continued)

(58) Field of Classification Search
CPC .......... B64C 2201/12; B64C 2201/141; B64C 39/024; G01T 1/167; G05D 1/104; G06Q 50/28; G01V 5/0016; G01V 5/0075
See application file for complete search history.

(56) References Cited

U.S. PATENT DOCUMENTS 2,656,470 A    10/1953  Herzog ................... 250/253
8,275,567 B2 *  9/2012  Lightfoot .............. G01V 5/0075
                                                250/252.1
(Continued)

FOREIGN PATENT DOCUMENTS

GB    2456302 A    7/2009  ............. G01T 1/36
GB    2511754 A    9/2014  ............. G01T 1/167
(Continued)

OTHER PUBLICATIONS

Young, Christina M. et al., "Multiobjective Optimization of a Port-of-Entry Inspection Policy," IEEE Transactions on Automation Science and Engineering, vol. 7, No. 2, pp. 392-400, Apr. 1, 2010.
(Continued)

*Primary Examiner* — Matthew J. Reda
(74) *Attorney, Agent, or Firm* — Slayden Grubert Beard PLLC (57) ABSTRACT

A system for scanning shipping containers, comprising an unmanned vehicle, the unmanned vehicle includes a sensor, a processor, and a memory. The memory includes instructions for execution. The instructions, when executed by the processor, cause the unmanned vehicle to move along faces of a shipping container, and record container data collected from the sensor while scanning the shipping container.

3 Claims, 5 Drawing Sheets

Related U.S. Application Data (60) Provisional application No. 62/527,759, filed on Jun. 30, 2017.

(51) Int. Cl.
  *G01V 5/26* (2024.01)
  *G05D 1/00* (2006.01)
  *G06Q 10/08* (2023.01)
  *B64U 101/00* (2023.01)

(52) U.S. Cl.
  CPC ......... *G05D 1/104* (2013.01); *B64U 2101/00* (2023.01); *B64U 2201/10* (2023.01)

(56) References Cited

U.S. PATENT DOCUMENTS

| | | | | |
|---|---|---|---|---|
| 9,336,505 | B1* | 5/2016 | Meyers | G06Q 10/083 |
| 10,156,528 | B2 | 12/2018 | Chen et al. | |
| 10,605,932 | B1 | 3/2020 | Newman | |
| 11,010,852 | B2* | 5/2021 | Hansell | G06Q 50/28 |
| 2006/0008137 | A1* | 1/2006 | Nagahdaripour | G06V 10/147 |
| | | | | 382/154 |
| 2007/0023714 | A1* | 2/2007 | Bohinc | G01V 5/0075 |
| | | | | 340/600 |
| 2007/0278423 | A1* | 12/2007 | Eikman | G01V 5/0016 |
| | | | | 250/484.5 |
| 2009/0101826 | A1* | 4/2009 | Frank | G01V 5/0083 |
| | | | | 702/180 |
| 2010/0283619 | A1* | 11/2010 | Frank | G06Q 10/08 |
| | | | | 340/600 |
| 2014/0354809 | A1* | 12/2014 | Shondel | H04N 7/185 |
| | | | | 348/144 |
| 2015/0192690 | A1* | 7/2015 | Bridger | G01N 23/04 |
| | | | | 378/57 |
| 2016/0018532 | A1* | 1/2016 | Scott | G01T 7/00 |
| | | | | 250/336.1 |
| 2017/0329037 | A1* | 11/2017 | Zhou | G01V 5/0025 |
| 2017/0357026 | A1* | 12/2017 | Gallagher | G01V 5/0016 |

FOREIGN PATENT DOCUMENTS

| | | | | |
|---|---|---|---|---|
| JP | 60113173 A | 6/1985 | | G01T 1/16 |
| WO | 2004/090829 A1 | 10/2004 | | G08B 17/12 |
| WO | 2009/143131 A2 | 11/2009 | | G06K 17/00 |

OTHER PUBLICATIONS

Boudergui, K. et al., "Development of a Drone Equipped with Optimized Sensors for Nuclear and Radiological Risk Characterization," IEEE 2$^{nd}$ International Conference on Advancements in Nuclear Instrumentation Measurement Methods and Their Applications, 9 pages, Jun. 6, 2011.

European Office Action & Extended Search Report, Application No. 18743664.7, 12 pages, Jul. 19, 2021.

Siegel, M.W. et al., "Robotic Systems for Deploying Sensors to Detect Contraband in Cargo," URL: https:..www.researchgate.net/publication/2679738_ROBOTIC_SYSTEMS_for_DEPLOYING_SENSORS_to_DETECT_CONTRABAND_in_CARGO, 13 pages, Sep. 1, 1997.

International Search Report and Written Opinion, Application No. PCT/US2018/040542, 19 pages, Dec. 5, 2018.

* cited by examiner

UNMANNED AUTONOMOUS CONTAINER INSPECTION

PRIORITY

The present application is a Continuation of U.S. application Ser. No. 16/024,983 filed Jul. 2, 2018, which claims priority to U.S. Provisional Application No. 62/527,759 filed Jun. 30, 2017, the contents of which are hereby incorporated by reference in their entirety.

TECHNICAL FIELD

The present disclosure relates to methods and systems for container inspection and, more particularly, to unmanned autonomous vehicle container inspection.

BACKGROUND

In United States ports alone, nearly 12 million cargo containers are unloaded without any physical scanning before they arrive. Once they arrive, containers may be passed through static radiation detectors. Any containers designated as high risk may be passed through further x-ray or gamma ray machines which image the containers' contents. Such static radiation detectors may detect gamma rays or neutrons emitted by sources of, for example, uranium and plutonium.

Gamma rays may be detected by observing the effects they have on matter. A gamma ray can interact with matter through several physical processes, each of which results in a transfer of energy from the gamma ray to the matter and depends on both the energy of the gamma ray and the properties of the matter with which it interacts. In Compton scattering, a gamma ray will collide with an electron and bounce off it. In photoelectric ionization, a gamma ray can push an electron to a higher energy level. As gamma-rays have so much energy, part of this energy can be transformed into matter directly by creating an electron and an anti-electron (or positron), a process known as pair production. All of these interactions cause energy to be transferred to the material, and in some types of materials this produces a signal (such as light or an electric current) that can be measured using electronic detectors. The signal can then be amplified and measured to estimate the energy and direction of the original gamma ray.

SUMMARY

Embodiments of the present disclosure may include an unmanned vehicle. The unmanned vehicle may include a sensor, a processor, and a memory with instructions for causing the unmanned vehicle to move along faces of a shipping container, and record container data collected from the sensor while scanning the shipping container.

Embodiments of the present disclosure may include a system. The system may include a processor and a memory. The memory may include instructions for execution. The instructions, when executed by the processor, may cause an unmanned vehicle to move along faces of a shipping container and record container data collected from the sensor while scanning the shipping container. In combination with any of the above embodiments, the system may include the unmanned vehicle. In combination with any of the above embodiments, the system may include a server. In combination with any of the above embodiments, the system may include a stationary array of sensor elements. In combination with any of the above embodiments, the stationary array of elements may be configured to measure background radiation data. In combination with any of the above embodiments, the server may be configured to identify whether the container includes a given material based upon the container data collected by the unmanned vehicle while moving, adjusted for the background radiation data collected by the stationary array of sensor elements. In combination with any of the above embodiments, the system may further include radiation sensors arranged in a two-dimensional array. In combination with any of the above embodiments, the server may be further configured to identify radiation in an area of the radiation sensors. In combination with any of the above embodiments, the server may be configured to determine, for each radiation sensor in the two-dimensional array, a direction of a source of the radiation, and identify a location of the source of the radiation from interpolation of the direction determined for each radiation sensor in the two-dimensional array. In combination with any of the above embodiments, the server may be configured to make a preliminary determination that the container may include a given material based upon the container data collected by the unmanned vehicle while moving and, based upon the preliminary determination that the container may include the given material, order another unmanned vehicle inspection of the container to gather additional information using unmanned vehicle sensors. In combination with any of the above embodiments, the other unmanned vehicle inspection of the container may be of a longer duration than an initial unmanned vehicle inspection of the container. In combination with any of the above embodiments, the other unmanned vehicle inspection of the container may be closer to the container than an initial unmanned vehicle inspection of the container. In combination with any of the above embodiments, the server may be configured to instruct the unmanned vehicle to move along faces of the shipping container and record container data based upon a previous indication that the container may include a given material. In combination with any of the above embodiments, the unmanned vehicle may be further configured to record position information, and record container data as a function of the position information. In combination with any of the above embodiments, the server may be configured to reconstruct a position of the unmanned vehicle based upon the container data recorded as a function of the position information. In combination with any of the above embodiments, the server may be further configured to reconstruct the position or altitude of the unmanned vehicle based upon a $(1/(r^2))$ drop-off of radiation. In combination with any of the above embodiments, the server may be configured to identify whether the container includes a given material based upon the container data collected by the unmanned vehicle as compared to data indicating known radioactive sources. In combination with any of the above embodiments, the system may include another unmanned vehicle including an active radiation source. The other unmanned vehicle may be configured to move along faces of the shipping container opposite the unmanned vehicle. The unmanned vehicle may include a passive sensor configured to detect radiation from the active radiation source. The unmanned vehicle may be configured to record container data collected from the passive sensor while scanning the shipping container. The server may be configured to analyze signatures from the container data collected from the passive sensor.

Embodiments of the present disclosure may include an article of article of manufacture comprising a non-transitory memory. The memory may include instructions. The instructions, when loaded and executed by a processor, may cause the processor to perform the configuration of any of the servers, systems, or vehicles of the above embodiments.

Embodiments of the present disclosure may include methods performed by any of the servers, systems, vehicles, or processors of the above embodiments.

DETAILED DESCRIPTION

Figure 1:
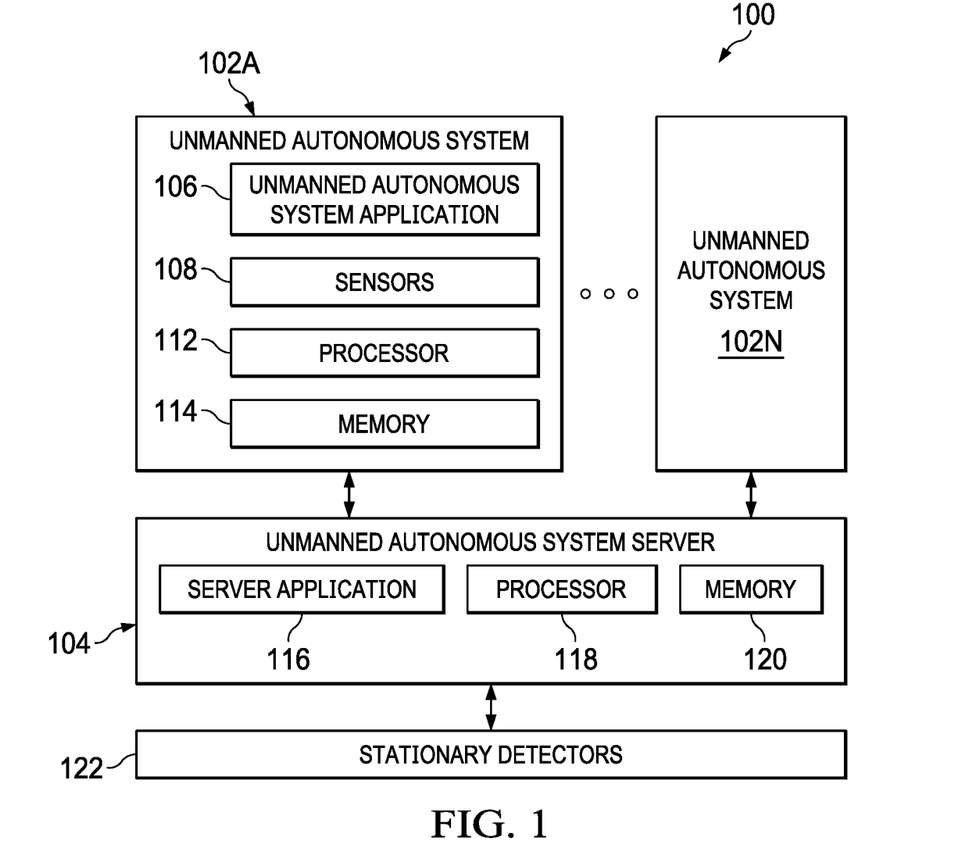
FIG. 1 is an illustration of a system 100 utilizing an unmanned autonomous system, according to embodiments of the present disclosure

FIG. 1 is an illustration of a system 100 utilizing an unmanned autonomous system (UAS), according to embodiments of the present disclosure. System 100 may be configured to inspect one or more shipping containers. In one embodiment, system 100 may include one or more UASs 102. In another embodiment, system 100 may include one or more host servers 104. A single instance of host server 104 may be in communication with multiple UASs 102. Any suitable number of UASs 102 may be used. UASs 102 may include, for example, an aerial vehicle or drone.

System 100 may be used to detect radiation sources in cargo or conveyances at consolidation points, such as ports, without requiring the shipping containers or conveyances to be routed past stationary radiation detectors or radiography machines. System 100 may use UASs 102 mounted with radiation detectors moving past cargo or conveyances. In one embodiment, background radiation levels may be measured by unobtrusive stationary detectors 122 at key locations in the area in which the scanning is going to occur. This information may be continuously analyzed along with the data collected from UAS 102. Software in UAS 102 or server 104 may be configured to evaluate and analyze the spectral signature of any radiation detected by UAS 102 against a database of radioactive sources including both potentially dangerous sources (such as radiological weapons or nuclear devices) and materials that have high levels of naturally occurring radiation and pose no threat (such as ceramics).

Scanning containers or conveyances for radiation in a dynamic location such as a port using UAS 102 creates major challenges in terms of measuring and accounting for background radiation. Simply mounting commercially available radiation detectors on UAS 102 will not work for the desired monitoring purposes because the sensitivity is continuously affected by the changing radiation background. In a land, air, or seaport the containers and conveyances are constantly moving and in different configurations. Because of the sensitivity of the activity and the high levels of accuracy that are required, system 100 may overcome these challenges by networking the detectors mounted on UAS 102 with fixed detectors 122 located at key locations throughout the port or other facility in which the scanning is being conducted. Furthermore, software on UAS 102 or server 104 may compare the signal collected by the detectors located on UAS 102 against the background radiation measured by stationary detectors 122 to identify anomalies. This may yield a continuously updated radiation map. Continuous communication between stationary detectors 122 and the detectors on UAS 102 may be used to quickly and accurately evaluate whether radiation signals come from background radiation or from a source located within cargo or conveyances. Furthermore, these may be used to determine whether such a radioactive source comprises a threat.

UAS 102 may be configured to detect radiation. System 100 may then be configured to locate the source of the radiation through triangulation or other reconstruction methodsb. Furthermore, system 100 may be configured to identify the nature of the radiation. In one embodiment, once an initial signal is detected, UAS 102 may then perform another inspection. In this inspection, UAS 102 may follow a predetermined pattern to determine the exact location of a radiation source and maximize the utility of the data collected about the source. In some cases, a differently configured instance of UAS 102 may be deployed to more efficiently identify a radiation source that has already been located by the first instance of UAS 102. In a second search, UAS 102 may be configured to loiter for longer periods of time near the potential radiation source in order to collect as much information as possible. From a second search, system 100 may match a detected signal against a database of radiation signatures to more accurately identify the source of the radiation.

UAS 102 may be implemented in any suitable manner according to the teachings of the present disclosure. UAS 102 may include a UAS application 106. Although described as a single application, UAS application 106 may be implemented by any suitable number and kind of applications, scripts, programs, executables, libraries, drivers, functions, or other instructions for execution. The instructions may be resident on one or more memories 14 for execution by one or more processors 112. Functionality of UAS 102 may be performed by UAS application 106. UAS may include any suitable number and kind of rotors, tracks, wheels, motors, or other components for locomotion.

Server 104 may be implemented in any suitable manner according to the teachings of the present disclosure. Server 104 may be implemented, for example, as a rack server, blade server, laptop, computer, cloud computing network, mobile device, or any other suitable electronic device. Server 104 may include a server application 116. Although described as a single application, server application 116 may be implemented by any suitable number and kind of applications, scripts, programs, executables, libraries, drivers, functions, or other instructions for execution. The instructions may be resident on one or more memories 120 for execution by one or more processors 118. Functionality of server 104 may be performed by server application 116.

In various embodiments, operations and configurations of server application 116 may be performed instead by UAS application 106, and vice-versa. UAS application 106 may be primarily responsible for controlling motion of UAS 102 based upon a specified flight path, and for storing position and orientation of UAS 102 as a function of time. Furthermore, UAS application 106 may be primarily responsible for operating radiation detectors aboard UAS 102, recording data, performing low-level analysis of the spectral data, and reporting the data to server 104. Server application 116 may be primarily responsible for setting flight paths for UAS 102, identifying follow-up UAS inspection, integrating data from UAS 102 and stationary detectors 122 to generate and update a background map of radiation data, setting alarm conditions, identifying alarm conditions, and reporting alarms to users of system 100.

Stationary detectors 122 may include any suitable number and kind of sensors, similar to sensors used in sensors 108 in UAS 102. Stationary detectors 122 may be configured to continuously record spectral information as a function of time. Stationary detectors 122 may operate continuously and thus can be well characterized with calibration measurements. Stationary detectors 122 may be used to measure steady background radiation spectra rather than transient anomalies. Thus, cheaper, lower resolution detectors may be used. Stationary detectors 122 may include a larger volume of detectors with a lower resolution than sensors 108 in UAS 102. Stationary detectors 122 may be, for example, a gamma ray detector such as a polyvinyl toluene (PVT) or sodium iodide (NaI) detector. Stationary detectors 122 may be communicatively coupled to server 104 or UAS 102 to provide background radiation information that may be used to adjust or interpret data detected by UAS 102.

The effectiveness of the background mapping may be optionally enhanced by constructing the stationary detectors 122 with partitions in their sensitive volumes. For example, stationary detectors 122 may be formed in a 2×2×2 or 3×3×3 array of cubes, forming a larger cube. This may provide rudimentary directional information about the background radiation and add to the mapping of the radiation. For example, if a patch of concrete beneath one container stack is significantly more naturally radioactive than adjacent stacks, this directional info can be used to better localize the background radiation and thus provide higher sensitivity away from the higher background area when considering measurements made by UAS 102.

Stationary detectors 122 may be placed in a known pattern throughout the inspection area. The location of stationary detectors 122 may be recorded in a coordinate system that is communicated to and common with UAS 102. Data from stationary detectors 122 may then be interpolated as a function of position and time to create a map of the background radiation throughout the inspection area to provide high quality background data to for inspection comparisons. The density of a network of stationary detectors 122 may be varied based on the constraints of the inspection area, level of variability of the background radiation, and desired alarm specificity.

UAS 102 may be implemented, for example, as an aerial UAS or drone. UAS 102 may include any suitable number of rotors or propellers. For example, UAS 102 may include four, six, eight, or other numbers of rotors. UAS 102, its sensors, and transmission and communications systems therein may employ weatherproofing to allow them to be used in inclement weather. UAS 102 may be operated by onboard battery or tethered to power sources to remain in use for extended periods of time. The sensors carried on UAS 102 may have their own batteries or be connected to the battery operating UAS 102. UAS 102 may be configured to fly in both manually operated and autonomous modes to search cargo. The routes used to search containers may be matched to particular cargo configurations within the containers and particular configurations of containers within ports or in transit. These routes may be developed on the basis of testing. UAS 102 may employ specific search routes when the contents of the container are alleged to be a specific type and can be efficiently searched with specialized patterns. UAS 102 may be implemented in vehicles that that do not fly, which may be magnetized with tank treads, using wheels, moving on legs (robotic spiders), suction, gels, metal legs that flip over, and other means of conveyance.

UAS 102 may include sensors 108. UAS 102 may include any suitable number and kind of sensors 108. Some of sensors 108 may include sensors for guidance and locomotion. Such sensors may include cameras, altimeters, global positioning system (GPS) sensors, proximity sensors, ranger finders, other location sensors, speedometers, wind sensors, telemetry sensors, vibration sensors, and motor monitoring sensors. UAS 102 may include software to power motors, rotors, wheels, or other components for locomotion based upon the sensors for guidance and locomotion and upon an intended flight path. The intended flight path may be controlled by a preprogrammed flight plan to search a designated container or containers, or may be controlled manually by a user. The flight path may be set by UAS 102 or server 104.

Sensors 108 may include sensors for identifying content of cargo containers. For example, sensors 108 may include passive radiation detectors. Sensors 108 may be configured to detect gamma, neutron, x-ray, or other radiation. The passive detectors may include spectroscopic detectors, scintillators, or other variations of sensors. Sensors 108 may further include radiation isotope identification devices or other active source radioactive material detection systems, which could allow greater accuracy in the scanning of cargo containers for radioactive materials. Furthermore, sensors 108 may include LiDAR, thermal imaging, infrared, penetrative cameras and other imaging, night vision, sensors for specific substances. These may include $CO_2$ sensors used to identify the presence of stowaways or human trafficking victims, chemical sensors, or sensors linked to types of contraband including narcotics, etc. Sensors 108 may include x-ray and gamma ray imaging cameras and sensors that can be mounted on UAS 102 with the ability to image within containers or vehicles. Sensors 108 may provide continuous readings or take measurements at defined intervals that have been identified through testing.

Sensors 108 may require specific mounting configurations and weight counter-balancing. Sensors 108 may be mounted on UAS 102 in any suitable manner. For example, UAS 102 may include sensors 108 mounted using carbon fiber or other ultralight materials. The mounts may include interchangeable racking so that different sensors can be used on the same UAS. UAS 102 may be mounted with multiple sensors or carry one at a time. The mounting may require an appropriate counterweight. The mounting may allow a radiation detector to be placed further forward or away from the main body of UAS 102 than other sensors or cameras on a UAS 102. This configuration may increase the accuracy of the radiation detector by getting it as close to the container or cargo as is possible.

Sensors 108 may be configured to interface with server 104 through UAS application 106 and server application 116. Server 104 may be configured to integrate data from multiple instances of UAS 102 and stationary detectors 122. UAS 102 may implement sensors 108 and UAS application 106 with, for example, a small single board computer running the data acquisition software on board. UAS 102 may be configured to collect information independently of server 104 and store information even without a present connection to server 104. UAS 102 may be configured to include a smaller version of a threat database, including thresholds of radiation detection. UAS 102 may be configured to pinpoint the exact location and altitude where a reading occurred. UAS 102 may be configured to report to server 104 in real-time, periodically, or after resumption of a communications channel. In one embodiment, UAS 102 may be configured to perform a second search based upon its own decisions about data collected from a first search. UAS 102 may include, for example, a MicroSD card for onboard data storage allowing data collection to continue in the absence of a connection to the ground based system for later comparison.

Sensors 108 for detection of radiation sources may be implemented independently of sensors 108 for guidance and physical control of UAS 102. Sensors 108 may perform communication with server 104 that is independent of the rest of UAS 102. Thus, sensors 108 may provide complete access to the data produced by detectors. Moreover, radiation detection may function independently from the rest of UAS 102.

UAS 102 may include an antennae or other communication mechanisms to server 104. The communication may include any suitable communications technique or protocol. Preferably, wireless communications may be used. Data collected by sensors 108 on UAS 102 may be transmitted through any suitable mechanism to server 104 including Bluetooth, cellular networks, Wi-Fi, microwave transmission, through a tethered cable, and other mechanisms and protocols. Data stored on UAS 102 may be transmitted to server 104 periodically or in real-time. The transmissions may be continuous or may involve some determined interval based on testing. Information may be relayed between UASs 102. The relays may be fixed in stationary locations around the area in which UAS 102 is being used or on vehicles that can be moved around to follow UAS 102. Transmissions may involve unique coding to ensure authenticity and defeat remote hacking. Data storage may be based on UAS 102, server 104, or other suitable locations.

Different instances of UAS 102 may be implemented with different packages of sensors 108. For example, an instance of UAS 102 performing initial scans of a container may have less sensitive detectors than an instance of UAS 102 that may perform a follow-up scan of the container, given an initial detection of radiation. The second instance of UAS 102 may include more sensitive radiation detectors that are better able to precisely determine the nature of a radioactive source, or have a greater active detector volume. For example, the second instance of UAS 102 may include arrays of cadmium zinc telluride crystal detectors, larger CsI detectors, or NaI detectors. These might provide greater active detection volume but would limit the operational time of UAS 102 due to the power requirements of carrying the greater detector weight. Such a second instance of UAS 102 might be deployed automatically or manually in response to a potential primary alarm.

UAS 102 or server 104 may be configured to securely transmit alerts and other suitable information to customs authorities, port operators, and other relevant entities. The alerts may be made based upon detection of a particular type, quantity, or other characteristic of cargo, such as contraband. Alerts may be sent to US or other customs authorities, port owners and terminal operators, shippers, freight forwarders, relevant shipping companies (especially during on-ship applications), importers, or other relevant entities within the supply chain as appropriate.

System 100 may be used to inspect cargo shipping containers. While the term "container" may be used to describe nearly any sort of mechanism for shipping goods, system 100 may be adapted to search or inspect standardized shipping containers designed and built for intermodal freight transport. Such containers may be loaded and used in ships, railroads, or trucks without unloading and reloading their contents. Furthermore, such containers form the basis for standardized global and regional freight transport. The containers may be known as container, cargo container, freight container, ISO container, shipping container, sea container, ocean container, container van box, sea can, or c can. The containers may be identified according to the ISO 6346 standard. The containers may be implemented as steel boxes and in standard sizes such as twenty or forty feet, six or twelve-meter standard length with heights of 8 feet 6 inches (2.6 meters) or 9 feet 6 inches (2.9 meters). The containers may be frequently stacked together in all three directions-height, length, and width. The containers may include doors that open only at one end of the container.

System 100 may be configured to solve security problems for containers. Such security problems have become more problematic in recent years, particularly for maritime cargo. System 100 may overcome lax security standards for containerized cargo. System 100 may enable expanded screening of—for example—the nearly 12 million cargo containers that are unloaded in U.S. ports every year, allowing screening before they are shipped, while they are in transit, and continuously after they arrive in the destination port. Other solutions, such as physical scanning and inspection, are limited in their ability to actually inspect every container, particularly when containers or their doors within or on top of a stack are physically inaccessible. Ports are limited in their ability to perform radiation, x-ray, or gamma ray inspection of containers. Stationary radiation screening in particular has significant limitations, as even if it detects the materials that would go into a radiological dispersion devices ("dirty bombs"), it would be unlikely to detect the fissile material of a nuclear weapon, particularly if the weapon were shielded. Furthermore, stationary radiation detection leads to an enormous number of false positives from naturally radioactive but benign goods like kitty litter and ceramics.

Other solutions involve more rigorous standardization of improved scanning equipment and scanning a higher percentage of cargo at ports around the world. Moreover, other solutions also include the use of sensors and security devices that would be placed on every container and then tracked for any kinds of alerts. Some such proposals include replacing every steel container in the global supply chain with carbon fiber replacements with integrated electronics. There are approximately 20.5 million intermodal containers moving through the global supply chain, and any system that relies on retrofitting all of them with individual sensors and security devices would be a huge undertaking requiring significant coordination and agreement on standards. A mass production model of a smart container has not yet been developed and such containers might be more expensive than existing steel models. Some countries, such as the U.S., have taken yet another approach to station inspection officers at foreign ports to inspect containers before they reach the U.S. However, again, physical inspections of goods are time consuming and disruptive (a single container can take several officers half a workday to complete), and this approach requires cooperation at foreign port authorities. In addition, coordination is difficult because tracking of contents of containers is imprecise. The oversight of the global supply chain resides in various private and public-sector entities. For example, the exporter and importer for a shipment might know exactly what is inside a container, but the shipper may know only basic information from the manifest about the types of goods being carried. Conversely, while the shipper or terminal operator may know exactly where a container is, none of the other entities may have even basic information about where it is located aside from an arrival date at a specific location.

In contrast, embodiments of the present disclosure include system 100 that will significantly increase the security of containerized cargo without requiring changes to existing logistical processes. Furthermore, system 100 may significantly increase the security of containerized cargo without requiring retrofitting or replacement of the containers that are currently moving through the global supply chain.

Furthermore, system 100 may employ sensors at positions not used in the past for cargo inspection. By placing sensors on UAS 102, container data may be analyzed as arising from different positions, altitudes, and precise locations unobtainable through conventional methods. In conventional methods, such as where a container is moved past a stationary sensor, the precise location of a detected source within the container is not obtained. Furthermore, such a method requires moving a heavy container past a sensor. Instead, system 100 may rapidly search many containers by placing the sensor on UAS 102. However, placement of sensors 108 on UAS 102, rather than on static locations whereby a container is moved past a sensor, incurs technical challenges. For example, searching a container with sensors on UAS 102 may incur background noise or detect background radiation that is variable and may cause many false-positive readings. Such background radiation may be simply tared or zeroed out when a container is moved past a static sensor, since the static sensor remains in the same background environment at all times. Users of such conventional methods would thus not expect success when using sensors on UAS 102. Accordingly, embodiments of the present disclosure, by using an unconventional approach to placing sensors 108 on UAS 102, may further include solutions to the technical problems generated by the placement of such sensors. For example, use of small, mobile, and high-sensitivity detectors on UAS 102 rather than large fixed detector installations may require distinguishing measurements from sensors 108 from the natural background and, more importantly, transient phenomena (i.e., non-threatening radiation sources in cargo). System 100 may include a library of known sources of normally occurring radioactive materials that do not constitute threats in addition to the library of radioactive threats.

In some embodiments, UAS 102 may penetrate the sides of containers or vehicles and can insert cameras or other sensors inside the area to be searched. Such a UAS 102 may be used to penetrate the side wall or roof of a suspicious container with a small hole that would allow a camera or other sensor to be snaked into the container and see whether the contents matched what was described on entry documents and take other readings. As an example, if a passive radiation hit were found on a container on a ship that was supposed to be carrying textiles, UAS 102 could penetrate the side wall of the container and insert a camera that would allow the relevant authorities to see whether there was something dramatically different inside, such as a radiological weapon, without having to open or unpack the container.

UAS 102 may be used in various applications. In ports, UAS 102 may be used to search or scan containers: alongside container stacks using search algorithms; along the ends of containers using search algorithms; in stationary locations where cargo is being moved past for logistical purposes such as being loaded onto a ship; following a pattern to use active radiation sources and passive radiation detectors to inspect containers; landed or attached to the side of containers, penetrate the wall, and then insert sensors or cameras; or between container stacks using search algorithms. On ships, UAS 102 may also be used to search between container stacks using search algorithms or manually operated to search specific containers. At intermodal transportation centers, the UAS 102 may also be used to search containers using search algorithms. At factories, docks, or other locations where cargo is loaded, UAS 102 may search the cargo before it is loaded into the containers. Next to train tracks, UAS 102 may search containers while trains move by. In places adjacent to trucks carrying the containers, UAS 102 may search containers as they pass by. In other places, UAS 102 may be able to scan contents of a building, or other type of vehicles, such as aircraft or private boats, wherein the contents are unknown.

UAS 102 may search containers or groups of containers based upon search patterns. The patterns may be performed autonomously by UAS 102 in that the search patterns may be executed by UAS 102 rather than manually by a human operator of UAS 102. In some embodiments, a human operator may select a search algorithm to be performed by UAS 102 for a given container or a group of containers. In another embodiment, UAS 102 may be configured to select a search algorithm based upon an identification of a given container, layouts or stacks of containers, port or other geographical location, expected contents of a container, data from a previous scan or inspection of a container, or other suitable criteria. The search pattern may be based upon the type of sensor that is to be used. Any suitable number and kind of searches may be performed sequentially for a container or a group of containers. The search pattern or algorithm may be based upon testing of containers.

FIGS. 2-10 illustrate example search patterns of operation of UAS 102, according to embodiments of the present disclosure. The searches may be performed on a longest side of a container, but may also be performed on a bottom, top, or end of a container. A search may be entered for a given container at a most proximate place to UAS 102. The searches of FIGS. 2-10 may include an initial search. A second, more detailed search may be conducted if the initial search provides information that a threat is found in a container.

Figure 2:
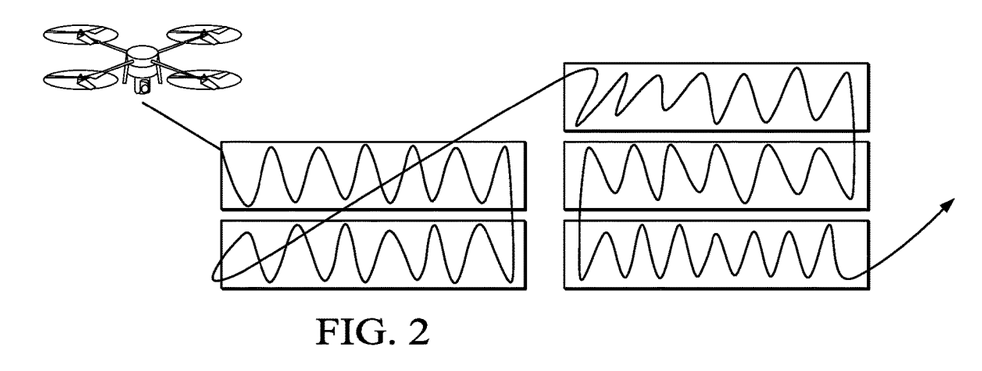
FIGS. 2-10 illustrate example search patterns of operation of an unmanned autonomous system, according to embodiments of the present disclosure.

FIG. 2 illustrates an example search pattern performed by UAS 102 including scanning individual containers in a vertical pattern from the side, according to embodiments of the present disclosure.

Figure 3:
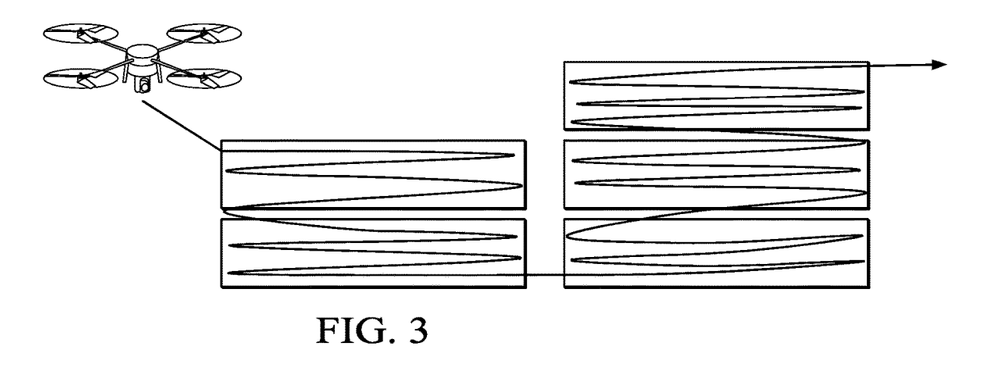

FIG. 3 illustrates an example search pattern performed by UAS 102 including scanning individual containers horizontally from the side, according to embodiments of the present disclosure.

Figure 4:
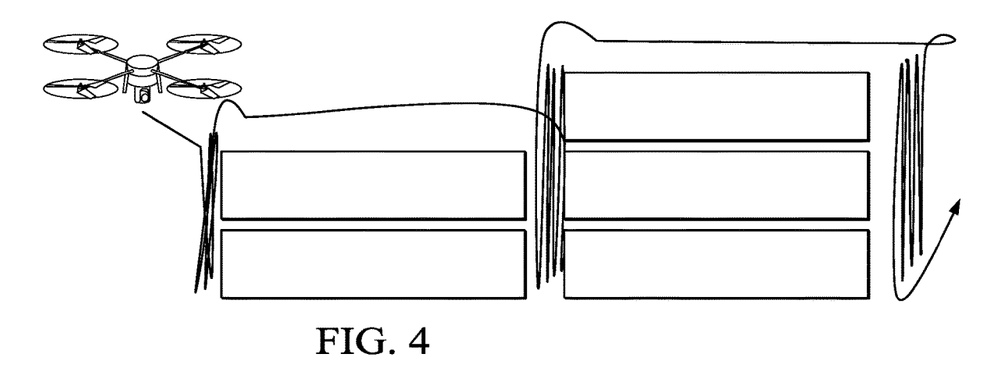

FIG. 4 illustrates an example search pattern performed by UAS 102 including scanning ends of multiple containers in a stack, according to embodiments of the present disclosure.

Figure 5:
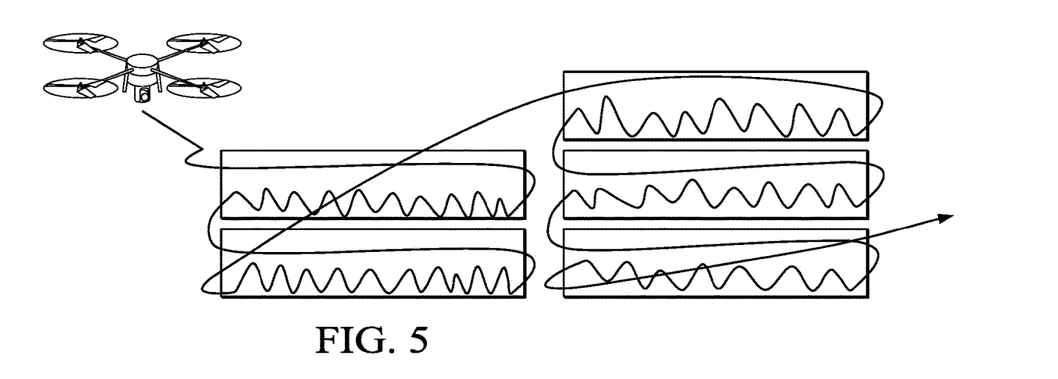

FIG. 5 illustrates an example search pattern performed by UAS 102 including scanning in a vertical pattern while spending more scan time on a lower half of a container, according to embodiments of the present disclosure. Such techniques may be used on cargo that is expected to, or may have been previously determined to be, in the lower part of the container.

Figure 6:
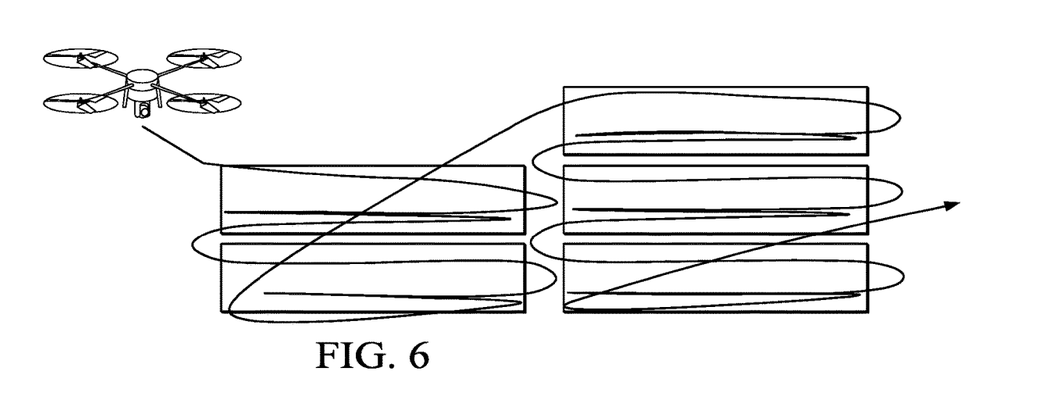

FIG. 6 illustrates another example search pattern performed by UAS 102 including scanning in a horizontal pattern while spending more scan time on a lower half of a container, according to embodiments of the present disclosure.

Figure 7:
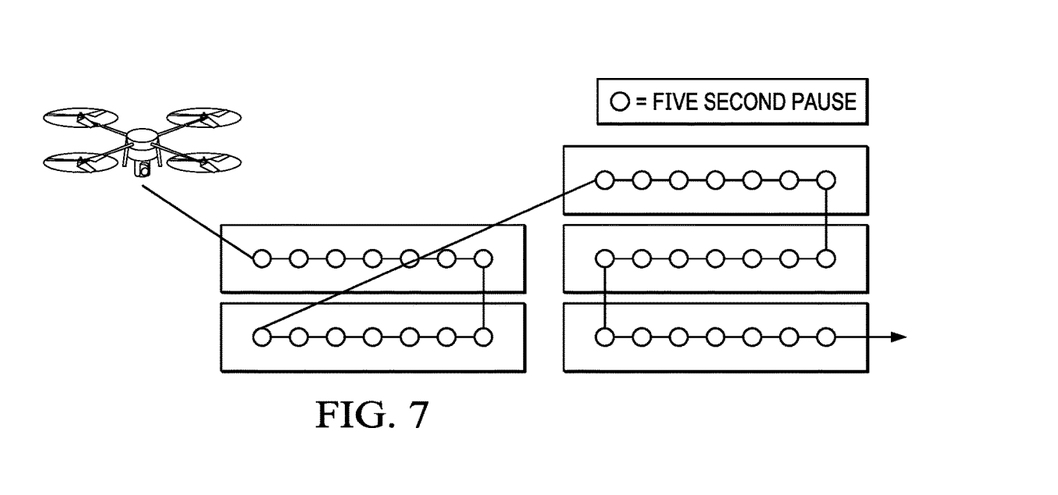

FIG. 7 illustrates an example search pattern performed by UAS 102 including searching contents of a container while stopping in intervals for a specified period of time, according to embodiments of the present disclosure. For example, every N feet during a scan performed according to any of the other example searches of the present disclosure, the UAS may pause, for example, for 5 seconds.

Figure 8:
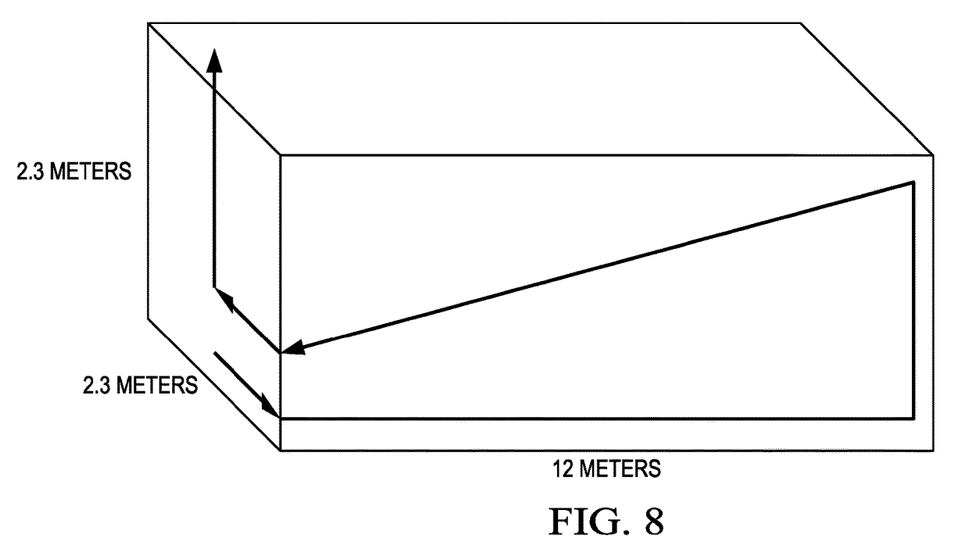

FIG. 8 illustrates an example search pattern performed UAS 102 including searching multiple faces of a container. The scan may include an entire container scan. The scan may search two faces, according to embodiments of the present disclosure.

Figure 9:
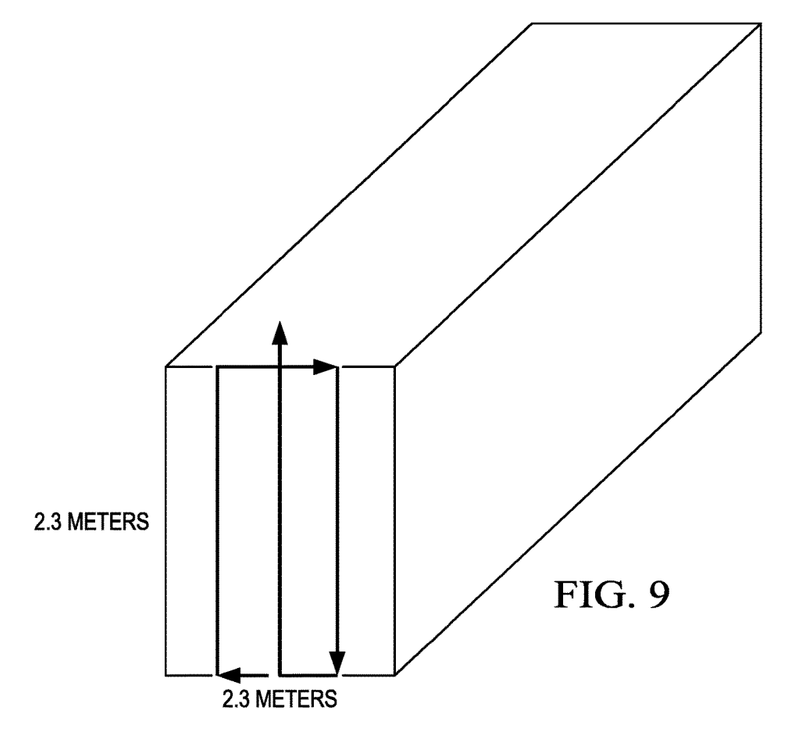

FIG. 9 illustrates an example search pattern performed UAS 102 including searching the door of a container, according to embodiments of the present disclosure.

Figure 10:
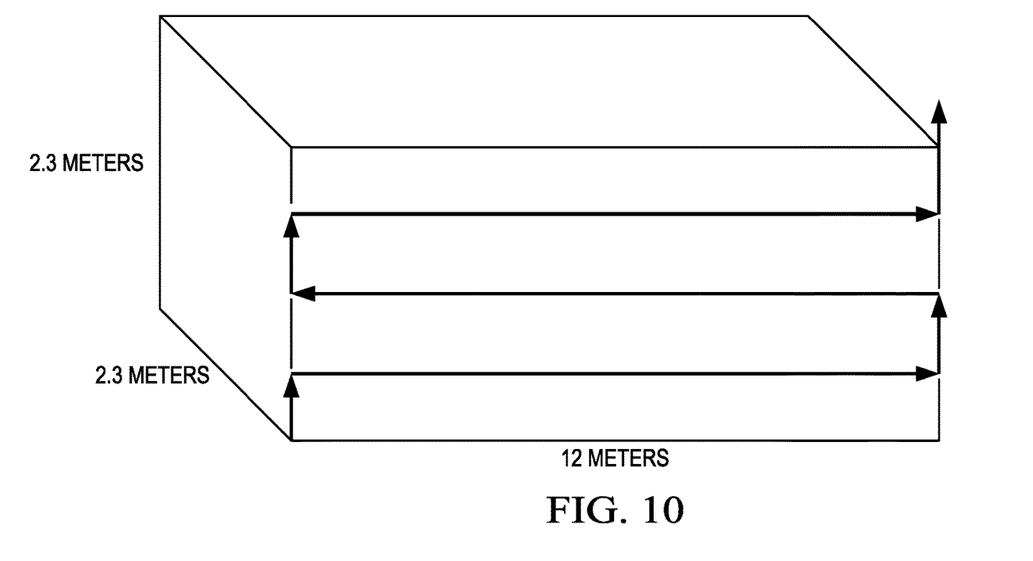

FIG. 10 illustrates an example search pattern performed UAS 102 including searching a single side of a container, according to embodiments of the present disclosure.

Figure 11:
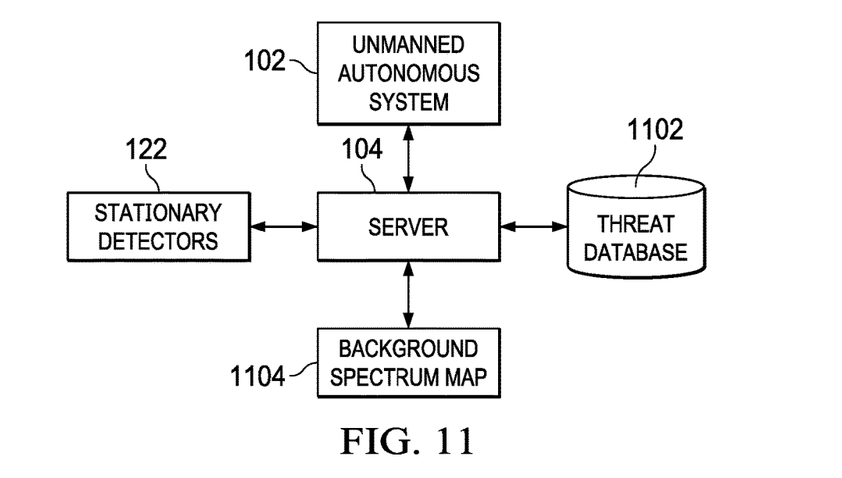
FIG. 11 illustrates configuration and operation of a system to detect threats, according to embodiments of then present disclosure.

FIG. 11 illustrates configuration and operation of system 100 to detect threats, according to embodiments of the present disclosure.

System 100 may include a threat database 1102. Threat database 1102 may be implemented in any suitable manner, such as by a relational database, look-up table, or other database. Threat database 1102 may include descriptions and characteristics of various dangerous materials, such as radioactive substances. Moreover, threat database 1102 may include descriptions and characteristics of dangerous materials as they would be perceived while shielded or located inside other materials. For example, threat database 1102 may include characteristics of a radiological dispersion device containing a particular type of radioactive material located within a certain width of metal shielding, further located within a steel shipping container. Conversely, threat database 110 may include descriptions and characteristics of materials that do not constitute a threat that nevertheless may give off a radioactive signature. For example, certain kinds of pottery may give off radioactive signatures. However, these signatures may indicate that the pottery is not a threat, despite giving off radioactive signals. The signatures and threshold levels of matching the signatures may be set by users and developed through situational testing. In addition, elements of threat database 1102 may be developed with Monte Carlo simulations of radiation emissions and the signals that would be identified by different sensors at different amounts of loiter time.

Threat database 1102 may include or account for various variables. In one embodiment, threat database 1102 may include signatures for different radiation sources. These radiation sources may include radiological dispersion devices, fissile materials, and nuclear weapons. In another embodiment, threat database 1102 may include signatures for various shielding and cargo configurations within containers or conveyances. For example, threat database 1102 may include signatures for different shielding thicknesses of lead or steel. In yet another embodiment, threat database 1102 may include signatures for various container configurations and stack depths. In still another embodiment, threat database 1102 may include signatures for different conveyances, such as small boats and general aviation aircraft, with both shielded and unshielded radiation sources. In another embodiment, threat database 1102 may include signatures for varying speeds, distances, search routes, and loiter times for different detector configurations of UAS 102. For example, signatures for uranium for positioning of UAS 102 at different external distances from the container and loiter times of UAS 102 may be included in threat database 1102.

In one embodiment, system 100 may measure environmental radiation as a function of time and location during inspection of a container. This environmental radiation may be used to form a background spectrum map 1104. Data collected by UAS 102 may be used in view of background spectrum map 1104. In particular, data collected by UAS 102 may be normalized by background spectrum map 1104 before being compared to elements of threat database 1102.

Server 104 may be configured to generate and update background spectrum map 1104 from data from stationary detectors 122. Stationary detectors 122 may operate autonomously, recording spectra as a function of time. These spectra are then reported to server 104. The spectra may include data fields such as the spectra as a function of time (discretized in time intervals), the position of the detector, and any available directional information regarding the detected radiation. Each of stationary detectors 122 may report its response function to varying energies of radiation on regular intervals. These data are reported to the central system. Server 104 may monitor data from stationary detectors 122 to look for changes in the background radiation levels and types. Changes in the background radiation levels and types may indicate that either a background detector is malfunctioning or a radioactive source had been brought near the detector. In the latter case, UAS 102 may be deployed to check for a possible alarm source. Stationary detectors 122 may provide significant improvements over previously used background monitoring, such as a fingerprint for an empty container. This may occur due to the longer integration time of the elements of system 100, rather than a calibration of a container which occurs at some intervals, and the ability of system 100 to map the background both spatially and temporally to suppress dependence on environmental factors.

If stationary detectors 122 are configured in a self-shielding array, the principal direction of each energy region of the recorded background spectrum may be recorded to provide more information to the background mapping routine. The direction of each energy component may be reconstructed using the relative spectrum counts at each energy in the different volumes of the detector array, according to measured or simulated attenuation of the detector materials. The directionality information may be generated along with an uncertainty (i.e., a cone in which the background radiation source is determined to be within).

Information from stationary detectors 122 may be used to estimate the background spectrum at all points throughout the inspection area to generate background spectrum map 1104. Depending on the complexity of the spatial distribution of the background radiation, the number and quality of sensors in the network, and the desired or necessary quality of background spectrum map 1104 (which may be affected by the available inspection times using the UAS and the level of background radiation), several methods may be used to interpolate data from stationary detectors 122. These may include, for example, 2D bilinear and spline methods, and kriging.

Background spectrum map 1104 may include dimensions or versions for specific isotopes detected in the background environment. Background spectrum map 1104 may be stored with a lookup key of position. Thus, background spectrum map 1104 may yield expected background spectra as a function of position, which may be queried by server 104 or UAS 102. Additionally, in the case of aerial UAS operation, the two-dimensional mapping in background spectrum map 1104 may be used to estimate background radiation throughout the entire three-dimensional geometric space geometrically using the $(1/(r^2))$ fall-off of radioactive source strength and by estimating the attenuation of any intervening material. The strength of detected radiation as a function of position may be fit assuming a point source to the $(1/(r^2))$ fall-off function, using a technique such as least-squares fitting, or the data may be used for a maximum likelihood analysis in cases where a point source poorly describes the data to determine the spatial extent of the detected source. The attenuation estimation may be conducted as a function of energy, using either a simulation of the intervening materials using software or by using a rough estimate from known gamma ray attenuation databases.

In some cases, stationary detectors 122 may be unavailable. This may arise from considerations such as cost or expedience of system deployment. In such cases, system 100 may be implemented and deployed in a mode in which sensors 108 on UAS 102 provide their own background monitoring. In this scenario, UAS 102 may be deployed in a regular pattern throughout the inspection area while transient events-such as the movement of containers or vehicles—are not occurring. This recorded data may be transmitted to server 104, which may process the data using the mapping procedure to generate background spectrum map 1104. Such background mapping might need to be conducted on a regular basis to account for seasonal effects, weather effects, and other environmental changes in the inspection area.

During an initial search of a container, UAS 102 may gather data. The data may be gathered according to, for example, search patterns shown above. For detection, different materials may require different times of measuring for radioactive sources. Thus, UAS 102 may perform a search pattern with a suitable amount of time to detect a given material with sufficient resolution (the ability to tell particles of different energies apart) and statistical power (the ability to detect enough particles to be probabilistically confident that a radioactive source is or is not present, which is related to the size, type, and counting time of the detector and the source strength). UAS 102 may perform search patterns of various durations depending upon the types of materials that are desired to be detectable. In one embodiment, the data may be analyzed by UAS 102. In another embodiment, the data may be sent to server 104, which may analyze the data. The data may be analyzed by evaluating signatures of the data with signatures in threat database 1102.

If an initial search of the container has yielded a probability within a designated threshold that the data matches a threat listed in threat database 1102, a second search may be initiated by the same or different UAS 102. The second search may be longer in duration.

Data recorded by UAS 102 may include the data from sensors 108 as a function of time, location, and speed. The location and speed may be recorded to determine flight paths actually taken as well as density of measurements. Density of measurements may affect the sensitivity of system 100 to radioactive materials. Denser, slower flight paths increase sensitivity while increasing inspection time. However, faster flight paths decrease sensitivity but allow faster, more efficient inspection. Consequently, an initial search may be performed using a less dense flight path while a second search may be performed using a denser flight path.

Data recorded by UAS 102, stationary detectors 122, and server 104 may include raw spectral, position, and time data used internally in system 100 to produce alarm decisions. The data may also include alarm decisions reported to the user. Furthermore, the data may include a log of the system's activities, as detected radiation and corrective actions.

Data captured by sensors 108 may be processed by UAS 102 to produce a calibrated energy spectrum. This spectrum may be stored as a histogram. The histogram may be stored as associated with the average time and position at which it was recorded. The intervals for the generation of each histogram may be set manually or dynamically based on the inspection conditions. Data analysis performed by server 104 or UAS 102 may include a list of significant particle energies detected along with the rate of detection, location, etc. The data analysis may include the system's estimate of what type of material gave rise to the detected particle energies. The data analysis may further include an estimate of the probability that the detections exceed the background level. The data analysis may also include an estimate of whether the detections match a known, safe source identified in threat database 1102 rather than an unknown source or a known, dangerous source.

As an example of an estimation of whether safe or dangerous source, if system 100 detects with high confidence the presence of a 1.001 MeV gamma ray that is a unique signature of U-238, system 100 would generate an alarm. Conversely, if system 100 detects with high confidence high levels of the 1.461 MeV gamma ray from K-40, this may simply indicate the presence of a load of potassium salt. Signatures for each type of material may be included within threat database 1102.

Users may set thresholds for system 100 for alarms. Particular sources of radiation may be selected for monitoring, as well as associated parameters such as source strength.

Analysis of data captured by sensors 108 may include determining if a non-background radiation source is present and, if so, determining the nature of the radiation source. Determining whether a non-background source is present may be achieved by comparing the spectra recorded by UAS 102 to the recorded background of background spectrum map 1104. Determining the nature of the radiation source may be achieved by comparing the spectra to known radiation sources and their expected appearance to the system as recorded in threat database 1102.

First, the spectra recorded by sensors 108 may be decomposed according to determine the energies of the source particles that lead to the detection. Each type of radioactive material is associated with characteristic radiation energies and particle types, and thus the decomposed spectrum may be used to assess the probability that a given material is present. Second, each known possible radiation source may be compared to the decomposed spectral signature. The possible radiation source may be identified locally in UAS 102 or as recorded in threat database 1102. Any potential matches may be reported. If a source is detected, system 100 may localize the source as described below and proceed to determine whether the source should be reported as an alarm.

For each detector, including sensors 108 and stationary detectors 122, a characterized detector response may be used to extract the source energies that contributed to the detected spectrum using known techniques. This process may include methods such as Bayesian unfolding, D'Agostini iteration, or Tikhonov regularization. From this unfolding, the energies of the source particles may be reconstructed, which provides a unique signature of most radioactive materials. With the detected radiation from UAS 102 and stationary detectors 122 characterized, the analysis may proceed by direct comparison of the decomposed spectral energies in the background (extracted from the background map at the position of the inspection) and data from UAS 102. This may be performed by a standard statistical comparison of counts at each detected energy to determine the excess of the detected radiation above the known background. Alternatively, a convolution of data from both stationary detectors 122 and sensors 108 may be used to produce the background spectrum map 1104. This instance of background spectrum map 1104 may be subtracted from measurements by sensors 108 to leave only counts from transient radiation sources. This approach may be advantageous since the background radiation is also measured in UAS 108 whenever a transient source is not present, which provides a basis to mesh the two signals. With the spectrum subtracted from data measured by sensors 108, the unfolding analysis may proceed more smoothly by eliminating the background or ignorable contributions to the spectrum from consideration. In any case, the result of considering this step may be to produce a function at each position along the inspection path that encodes the significance of above-background radiation levels at each detectable energy for each detectable particle type.

In addition, to reconstruction of characteristic specific energies, system 100 may discern information about the shielding of the source from detection due to other materials in the area if the source energy is determined.

When any significant source is detected, system 100 may determine the location of that source. Source localization may be achieved by first associating the spectral data and the identifiable components of the detected radiation with the position of the inspecting UAS 102 in the inspection area. This may be performed by server 104. Server 104 may generate a data map from data detected by UAS 102. Such a data map may be similar in structure to background spectrum map 1104. Interpolation for such a data map interpolation might not be needed since UAS 102 moves continuously throughout the inspection area. The path of UAS 102 may be discretized in time. The discretization may be performed in units to be determined by testing, and may be adjusted for different applications, and the integrated spectrum and average UAS position over that interval is determined. Each integrated spectrum may be analyzed to extract likely sources of radiation detected at each location on the path.

Using the points in space and their associated detected radiation sources, system 100 may determine the point in space at which the radiation source resides in two ways. First, system 100 may perform a reconstruction that assumes that each detected radiation type is due to a single point source. Then, system 100 may find the best position in space to account for the detected radiation along the path, assuming a (1/(r^2)) fall-off in the detected radiation. Uniform shielding may be assumed. A standard least-squares fitting algorithm may be used. Second, system 100 may use a maximum likelihood distribution approach. The maximum likelihood distribution approach may require greater computing resources, data quality, and programming effort, but may provide the capability of better localizing sources that are distributed in space or shielded in a non-uniform fashion.

Based on the detected decomposed energies, system 100 may then attempt to match those energies with known possible radiation sources. This may be performed by matching the specific detected energy (along with an uncertainty generated in the unfolding procedure) to a list of materials that generate radiation of a type or energy consistent with the detection. Such a list may be included in, for example, threat database 1102, or information derived therefrom. If multiple detectable energies of radiation are associated with a given material type (such as the two distinct gamma rays of Co-60), detection of this material type might require probabilistically matching the entire radioactive spectrum of that material. For each material, the effective shielded strength of the radiation is determined, if available. The shielded strength, along with the known natural radioactivity of the specific material, can be used to constrain a determined amount of material present given a known amount of shielding.

The detected materials may be compared against entries in threat database 1102. A given sample detected by UAS 102 may include multiple materials. The logical combination of such multiple materials may yield an alert that would not exist for individual determinations of the materials existing separately. For instance, a mix of detected materials consistent with a uranium nuclear weapon may be considered more threatening than detection of a single material present in such a device, which would be reflected in the alarm report. Alternatively, a mix of radioactive materials that is common to granite (a common source of non-threatening radioactivity) would be considered less threatening and may be excluded from alarm reports. This may reduce the number of false positives requiring intervention that are reported to the user.

Upon a radiation source detection event, the position of UAS 102 at such an event may be reconstructed by analysis of the data that was generated as a function of position and speed. The position may be passed to the instance of UAS 102 to conduct the second search. With this information, UAS 102 may be directed to approach the source as closely as possible. By approaching the source closely, data on a known source may be gathered more rapidly to permit clearer identification of the source and whether it constitutes a threat.

System 100 may produce an alarm when radioactive material is present in an inspection area that meets a user's definition of a threat. Before comparing data collected from UAS 102 to information from threat database 1102, the data may be integrated, compared, or otherwise adjusted with background sources of radiation to conduct a statistics-based analysis to determine the probability of the presence of a threat. These probabilities may be weighed against user thresholds and definitions, and in the event of a detection in excess of these thresholds, the user may be notified of the nature of the threat so as to take action.

Radioactive materials emit particles that may be detected using radiation detectors such as sensors 108 of UAS 102. The energies and types of these particles may provide specific information about the type of material that emitted them. For example, sensors 108 of UAS 102 may be configured to detect gamma ray (photons with energies from 0 to approximately 5 MeV) or neutron radiation. UAS 102 or server 104 may determine whether radiation gathered in a first, second, or other search of a container is anomalous relative to known sources of radiation identified in threat database 1102, analogous to known threats identified in threat database 1102, or anomalous relative to naturally occurring radiation. For example, normally occurring sources of radiation include the 1.46 MeV gamma ray from the isotope K, which occurs in cement, biological material, and many other sources. Another normally occurring source of radiation may include the 2.61 MeV gamma ray Tl-208, a naturally occurring decay product of uranium, which may be present in significant amounts in a shipment of granite.

Conversely, radioactive materials that would be identified as a threat may include radiological dispersion devices, radiological dispersion devices, nuclear weapons, or the materials required for such weapons. These may each emit a characteristic radiation spectrum, such as a distribution of particles as a function of energy. These may uniquely identify each material-if sufficiently and appropriately measured, as provided by system 100.

As an example of radioactive signals that may include both dangerous sources and safe sources from the background, UAS 102 may include thermal neutron detectors in sensors 108. Such sensors may be capable of detecting the neutrons produced by the spontaneous fission of certain nuclear materials, such as the strong neutron emission rates of Pu-240. However, naturally occurring neutrons may constitute background events. These background events may be defined by the rate of high energy cosmic rays, which may be characterized by independent measurements.

Operation of system 100 may be conducted in a fully autonomous operation mode. The fully autonomous operation mode may include sending a UAS 102 along a preset path with respect to a container, dynamically reacting to obstacles, dynamically reacting to potential detections of radiation sources, processing the data, and comparing the process data to the user's defined alarm thresholds to make alarm decisions. In this mode, the data may be analyzed continuously to generate alarms, or the data collected on UAS 102 may be stored and reported to the server 104 at a later time. The latter option may be useful in situations with poor connectivity or in cases where very long inspection times of fixed arrangements are possible, such as a shipping yard of containers waiting overnight.

Users may optionally control UAS 102 in particular circumstances for greater flexibility. For instance, UAS 102 may be controlled or flown manually, a user may inspect data and manually trigger an alarm, or the user may direct the UAS manually simply for the purposes of collecting data rather than making alarm decisions, such as in testing, calibration, or debugging efforts.

In addition, system 100 may operate in an automated response to other alarm sources. For example, other systems in a location such as a radiation portal monitor or a quay crane-mounted systems may generate an alarm. Since typically such other systems only have a few seconds to measure radiation from a source, they generally require a follow-up measurement to collect sufficient information to make an alarm decision. System 100 may perform such a follow-up measurement by providing the capability for UAS 102 to carry out the secondary inspection. Inspection may be made of containers near the object or objects generating the alarm. The alarm may provide position information, spectral data, for which UAS 102 may begin its search.

Following the spectral comparison described in the previous section, if the radiation levels and types meet the conditions set by the user an alarm report is generated. The conditions set by the user consist of threshold values in the probability that detected radiation is inconsistent with the known background radiation, the probability that the detected radiation is consistent with a known naturally occurring radioactive material (NORM) source (which may be paired with known manifest information when available), and the set of radioactive materials that the user is interested in detecting. Precise values of these thresholds will depend on the end user's needs based on factors such as desired false positive and false negative rates, level and knowledge of the background radiation (which improves with time due to the background network, when available), and outside/intelligence information regarding the nature of potential threats.

In the event of an alarm, a user of system 100 may be provided the nature of the alarm. This may include the probable radioactive material detected, the similarity to known normally occurring radiation sources, and spatial localization of the material. Once an alarm decision is made and reported to a user, system 100 may finalize the alarm and UAS 102 may proceed on a flight pattern to inspect other portions of the area of interest. In other cases, UAS 102 may remain in the vicinity of the alarm to collect more data increase the accuracy of the data and refine the alarm report. UAS 102 may proceed on a preexisting flight path after making a detection while system 100 automatically dispatches another instance of UAS 102 to inspect the alarm area in more detail.

In one embodiment, a pair of instances of UAS 102 may be used to scan containers using an active radiation source and a passive radiation sensor. For example, UAS 102A may include a well-characterized active radiation source such as Cs-137 among its sensors 108. Another UAS 102B may include a passive radiation sensor among its sensors 108. UAS 102A and UAS 102B may each traverse a container on opposite sides of the container. For example, UAS 102A and UAS 102B may traverse respective left and right, or front and back sides of the container. The flight paths for each of UAS 102A and 102B may be coordinated. The coordination of flight paths may be performed by server 104, or between on-board computers of UAS 102A, UAS 102B. The active source on UAS 102A may induce a reaction in materials in the container. The passive sensor on UAS 102B may detect signatures induced by the presence of the active source. The passive sensor on UAS 102B may measure the attenuation of the radiation from the active source due to the container and its contents. The passive sensor may collect the data and provide the data to server 104 for analysis. Server 104 may analyze the data for signatures identified as known safe, known malicious, or unknown sources.

Although example embodiments have been described above, other variations and embodiments may be made from this disclosure without departing from the spirit and scope of these embodiments.

The invention claimed is:

1. A system for scanning shipping containers, comprising an unmanned vehicle, the unmanned vehicle including:
   a sensor;
   a processor;
   a memory including instructions for execution, the instructions, when executed by the processor, for causing the unmanned vehicle to:
      perform a search by moving along at least one face of a shipping container while the container is in a first position in a stack of a plurality of shipping containers;
      record container data collected from the sensor while scanning the shipping container;
      make a preliminary determination that the container may include a given hazardous material based upon the container data collected by the unmanned vehicle while moving the preliminary determination based upon a non-deterministic probability within a designated threshold that the container data matches a threat in a threat database; and
      based on the preliminary determination that the container may include the given hazardous material:
         order another unmanned vehicle inspection of the container to gather additional information using unmanned vehicle sensors, wherein:
            the other unmanned vehicle inspection of the container is of a longer duration than an initial unmanned vehicle inspection of the container in which the preliminary determination was made;
            the other unmanned vehicle inspection includes a denser and slower path than the initial unmanned vehicle inspection;

the other unmanned vehicle inspection includes repeating the search and again moving along the at least one face of the shipping container to record container data based upon the preliminary determination that the container includes the given hazardous material while the container remains the first position in the stack of the plurality of shipping containers.

2. An article of manufacture, comprising a non-transitory machine-readable medium, the medium including instructions, the instructions, when loaded and executed by a processor, cause an unmanned vehicle to:
perform a search by moving along at least one face of a shipping container while the container is in a first position in a stack of a plurality of shipping containers;
record container data collected from the sensor while scanning the shipping container;
make a preliminary determination that the container may include a given hazardous material based upon the container data collected by the unmanned vehicle while moving, the preliminary determination based upon a non-deterministic probability within a designated threshold that the container data matches a threat in a threat database; and
based on the preliminary determination that the container may include the given hazardous material, order another unmanned vehicle inspection of the container to gather additional information using unmanned vehicle sensors, wherein:
the other unmanned vehicle inspection of the container is of a longer duration than an initial unmanned vehicle inspection of the container in which the preliminary determination was made;
the other unmanned vehicle inspection includes a denser and slower path than the initial unmanned vehicle inspection;
the other unmanned vehicle inspection includes repeating the search and again moving along the at least one face of the shipping container to record container data based upon the preliminary determination that the container includes the given hazardous material while the container remains the first position in the stack of the plurality of shipping containers.

3. A method of operating an unmanned vehicle, including:
performing a search by moving along at least one face of a shipping container while the container is in a first position in a stack of a plurality of shipping containers;
recording container data collected from the sensor while scanning the shipping container;
making a preliminary determination that the container may include a given hazardous material based upon the container data collected by the unmanned vehicle while moving, the preliminary determination based upon a non-deterministic probability within a designated threshold that the container data matches a threat in a threat database; and
based on the preliminary determination that the container may include the given hazardous material, ordering another unmanned vehicle inspection of the container to gather additional information using unmanned vehicle sensors, wherein:
the other unmanned vehicle inspection of the container is of a longer duration than an initial unmanned vehicle inspection of the container in which the preliminary determination was made;
the other unmanned vehicle inspection includes a denser and slower path than the initial unmanned vehicle inspection;
the other unmanned vehicle inspection includes repeating the search and again moving along the at least one face of the shipping container to record container data based upon the preliminary determination that the container includes the given hazardous material while the container remains the first position in the stack of the plurality of shipping containers.

\* \* \* \* \*